July 8, 1958 — E. L. CLIFFORD ET AL — 2,842,220
METHOD OF SURVEYING A BOREHOLE
Filed Jan. 7, 1957 — 3 Sheets-Sheet 1

INVENTORS.
EDWARD L. CLIFFORD,
VERNON L. REDDING,
BY JAMES R. ORDING.
John B. Davidson
ATTORNEY.

INVENTORS.
EDWARD L. CLIFFORD,
VERNON L. REDDING,
BY JAMES R. ORDING.

United States Patent Office 2,842,220
Patented July 8, 1958

2,842,220
METHOD OF SURVEYING A BOREHOLE

Edward L. Clifford, Houston, Vernon L. Redding, Bellaire, and James R. Ording, Houston, Tex., assignors, by mesne assignments, to Esso Research and Engineering Company, Elizabeth, N. J., a corporation of Delaware Application January 7, 1957, Serial No. 632,832

7 Claims. (Cl. 181—.5)

This invention relates to geophysical prospecting and more particularly to the seismic surveying of a borehole drilled into the earth.

For the purpose of obtaining information as to the intersection of layers or strata in the earth with a borehole drilled into the earth, it has been the practice to lower a geophone into the borehole, to detonate a seismic charge at or near the earth's surface, and to record the output of the geophones due to the detonation. The information derived thereby is useful in conjunction with borehole logs obtained by conventional logging methods, utilizing electrical or chemical techniques to determine the location of possible oil bearing sands. Heretofore the usefulness of such seismic surveying has been limited by the almost exclusive use of "wiggly-trace" presentation methods for visually portraying the output signals of the geophones. It has been necessary for a technician to laboriously evaluate the confusing and often misleading information obtained from the "wiggles" to try to obtain an overall picture of the seismic wave phenomena in a particular area. Extreme difficulties have been encountered in evaluating the significance of such seismic information due in great part to the complex and confusing nature of the wave patterns recorded on the records resulting from "tube-waves" which are elastic waves that reverberate within the borehole. Confusion is compounded by so-called "multiple-reflections," which are waves that undergo bi-directional reflection between the boundaries of one or more strata of the earth. These multiple reflections add to and subtract from true reflections and make the identification of true, or single, reflections exceedingly difficult. In the past, it has required a week to a month's work to evaluate the results obtained by the seismic survey of a borehole and, at best, it has been possible to glean very little information from the conventional "wiggly-trace" types of presentation. Heretofore the seismic surveying of a borehole has been a theoretically useful technique, but in practice it has proven to be of limited value.

In conjunction with seismic prospecting systems wherein a plurality of geophones are positioned around a shotpoint at or near the earth's surface, presentation systems have been developed wherein the intensity of elastic waves detected by the geophones is represented as a straight line of narrow width, the density or darkness of the line varying as a function of the intensity of the signal being recorded. It now has been discovered that by lowering a string of geophones into a borehole so that a seismic trace may be obtained for signals detected at known spaced intervals down the borehole, and presenting the information derived therefrom in variable density form, the masking effects of tube-waves and multiple reflections are virtually obviated so that the overall seismic picture can be clearly shown. It has been found that the tube-waves, multiple reflections and primary reflections stand out separately and distinctly when the slope of the line of first impulses on the record is between 70° and 50° with respect to the traces of the signals from the individual geophones. This is particularly true when the slope is approximately 60°. The presentation should be such that the spacing between the individual traces is not appreciably greater than the width of the individual traces. Additionally, the traces for the individual geophones should be adjacent each other in the same order as the order of the geophones corresponding thereto going down the borehole.

In accordance with the teachings of the invention, the spacing between the individual geophones in the string should not be appreciably greater than one quarter wave length of the frequency of the seismic signals. The string of geophones should be lowered into the borehole in steps, the string traversing a discrete segment of the borehole in each step. Geophone signals resulting from actuation of a seismic source at each step of the lowering process may be recorded on magnetic tape and the recorded signals thereafter presented in variable density form, as described above.

An object of the invention is to provide a seismic system for logging a borehole wherein tube waves in the borehole will not mask reflections from reflecting horizons in the earth.

Another object of the invention is to provide an improved system for accurately and quickly determining the depths at which interfaces of the earth's strata intersect a borehole.

Still another object is to provide a seismic system for logging a borehole wherein a complete and overall picture of the seismic wave phenomena may be readily obtained.

Other objects and a more complete understanding of the invention will become apparent upon consideration of the following detailed description thereof when taken in connection with the accompanying drawings, wherein.

Figures 1, 2:
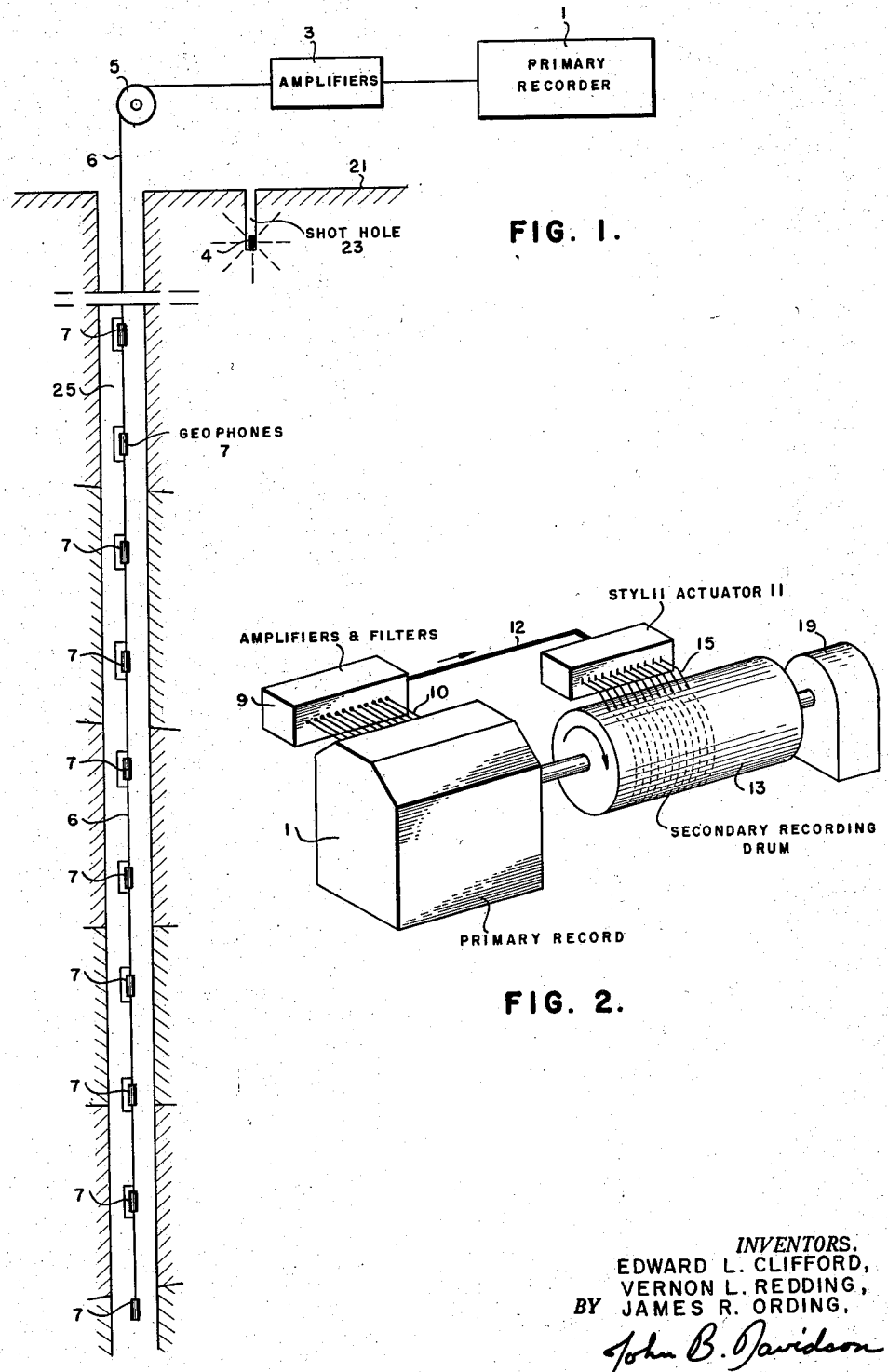
Fig. 1 is a schematic diagram depicting in elemental form apparatus utilized in connection with the invention.
Fig. 2 is a schematic isometric view of further apparatus utilized in connection with the invention.

With reference now to Fig. 1, there is shown a shothole 23 drilled beneath the surface 21 of the earth to get below the weathered layer of the earth. Shot-hole 23 contains a dynamite charge 4 for the purpose of initiating waves of an elastic nature. Manifestly, other methods of initiating seismic waves may be used, such, for example, dropping a weight on the surface of the earth.

For the purpose of detecting the seismic waves from source 4, a plurality of geophones 7 are lowered into borehole 25 by means of winch 5. The geophones may be of the type described in U. S. Patent 2,759,552 to J. R. Ording. The geophones should be spaced a known uniform distance apart; preferably the distance should not be appreciably greater than one quarter wave length at the seismic frequencies of interest. A spacing that has been found most efficacious is 10 feet. Thus, a string of 10 geophones may be utilized so as to traverse a one-hundred foot segment of the borehole, taking readings every 10 feet thereafter. A primary recorder 1 is coupled to the output of the geophones by electrical leads within or attached to a cable 6. This recorder may be of the type that records geophone output signals on a magnetic tape, such, for example, as that manufactured by Techno Instrument Company of Los Angeles, California, Model No. TI–400A.

If desired, an amplifier 3 may be utilized to amplify the signals before they are fed to recorder 1. The amplifier should not be frequency sensitive so that signals over a relatively broad band, including the frequencies which are normally used for seismic operations, will be uniformly amplified.

After seismic traces have been recorded on primary recorder 1 to the maximum depth to which it is desired to survey the borehole, the various traces are re-recorded in a visible form, as indicated above; in accordance with the teachings of this invention, the requisite form is that of a variable density presentation. This is achieved by the apparatus in Fig. 2. The magnetic traces on the magnetic tape in primary recorder 1 are "read out" of the recorder by a plurality of pick-up heads (not shown). The output signals from the primary recorder, which appear on output channel 10, are fed into amplifiers and filters in the conventional manner and utilized to actuate styli 11. Amplifiers and filters 9 are of conventional design. Like amplifier 3, the amplifiers should be designed to uniformly amplify signals of a wide range of frequencies. The filters may be low-pass, high-pass, or band-pass in accordance with the requirements imposed by the human operator. The output signals from amplifier and filter section 9 are coupled to styli 15 by means of a cable 12.

The apparatus, including styli actuator 11, styli 15 and drum 13, are preferably of the type shown in patent application Serial No. 513,854 for "Automatic Plotter," filed on June 7, 1955, by C. H. Carlisle et al. and assigned to the assignee of the present invention. In this type of recording apparatus electrical signals appearing on an individual stylus are "burned" onto electro-sensitive paper, the intensity of the current through the stylus and the paper determining the darkness of the trace appearing on the paper. Inasmuch as the intensity of the signals varies in accordance with the intensity of the seismic waves which they represent, each trace appearing on the electro-sensitive paper will vary in density in accordance with the intensity of the seismic signal which it represents. The drum 13 and primary recorder 1 may be driven by an electric motor in housing 19.

The operation of the apparatus described with reference to Figs. 1 and 2 is as follows: Geophones 7 are lowered into borehole 25 by means of winch 5 so that the uppermost geophone is at a predetermined depth within the borehole. Seismic charge 23 is detonated and the seismic waves detected by the geophones are recorded on primary recorder 1. The geophones 7 are lowered into the well until the uppermost geophone is below the depth of the lowermost geophone at the time of detonation of the first seismic charge, by an amount aproximately equal to the spacing between geophones. For example, if the spacing between geophones is ten feet and the lowermost geophone was at a depth of 120 feet at the time of detonation of the first explosive charge, the uppermost geophone will be lowered to a depth of 130 feet. A second explosive charge is detonated and the geophones are again lowered within the borehole until the uppermost geophone is again below the position formerly occupied by the lowermost geophone and again by a distance approximately equal to the spacing between geophones. This sequence of operation is repeated until the borehole 25 has been surveyed to the desired maximum depth The magnetic recordings that have been made by primary recorder 1 are recorded in variable density form by the secondary recording device including styli 15 and drum 13. If it is inconvenient to re-record at the same time all of the tracings that have been recorded by primary recorder 1, successive variable density tracings may be made by moving the actuator to the right as shown, after each group of primary tracings is read-out by primary recording device 1.

Figure 3:
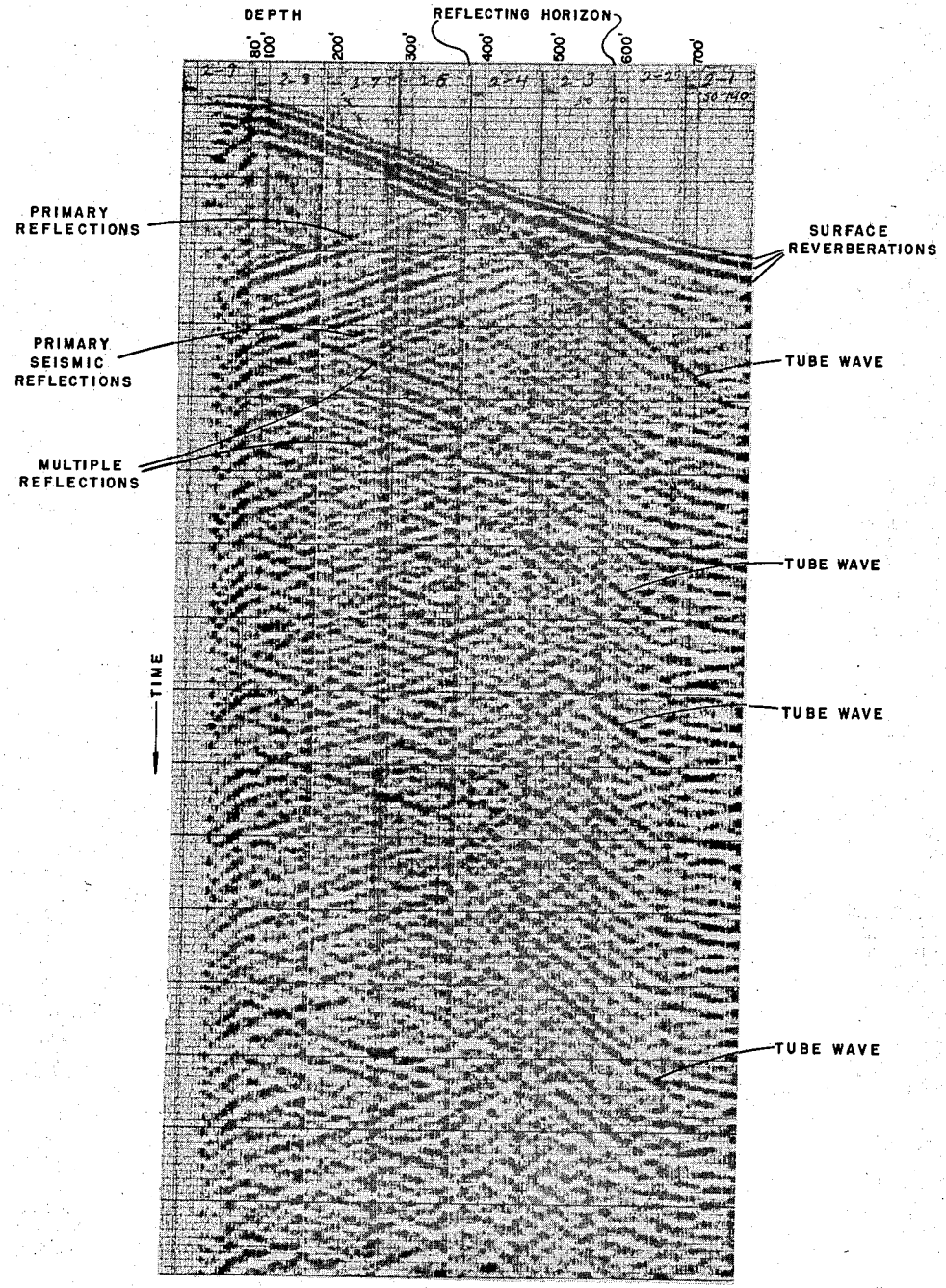
Fig. 3 is an actual variable-density section (or plurality of traces in side-by-side relationship) making use of the apparatus of Figs. 1 and 2 showing arrival times of waves at various depths in a borehole.

A typical variable density section (or plurality of traces recorded side-by-side) obtained utilizing the teachings of this invention is shown in Fig. 3. The horizontal axis of the section represents depth into the borehole and vertical axis represents time from initiation of the artificial seismic event. The three very dark lines at the top of the section are due to surface reverberations. The first line at the top of the section will henceforth be referred to as the line of "first kicks."

Distinct lines appear on the section which have a greater slope than the line of first kicks. These lines are due to tube-waves which travel much slower than seismic waves inasmuch as the velocity of sound in the drilling mud within the casing is somewhat less that the velocity of sound in water. The velocity of sound in the earth's formations is substantially higher than the velocity of sound in water and so will have less slope than the tube-waves.

A number of lines on the section will be noted that have a slope substantially the reverse of the slope of the line of the first kicks. Those of these lines that intersect with the line of first kicks are due to primary reflections from reflecting horizons. Lines substantially parallel to the line of the first kicks are due to multiple reflections within one or more of the earth's strata. Certain of the lines that have a reverse slope to that of the line of first kicks are also due to multiple reflections. It is rather easy to follow the reflections from the earth's surface to the first subterranean reflecting horizon, which horizon is marked on the trace.

It will be noted that when the section is viewed edgewise so that the angle of viewing is very small with respect to the plane of the paper, the lines due to various reflections and to tube-waves stand out distinctly. Thus it is quite easy to pick out true reflections by determining the reverse slope of lines of first kicks and holding the paper edgewise so that these lines will stand out prominently. Manifestly, the lines that are of most interest are within a few inches of the line of first kicks since it is here that true or primary reflections will appear. One device that has been quite useful in determining first reflections from a reflecting horizon has been to look for an intersection of lines representing a tube wave and a reflected wave at the line of first kicks. Almost invariably this will occur at a reflecting horizon.

Figure 5:
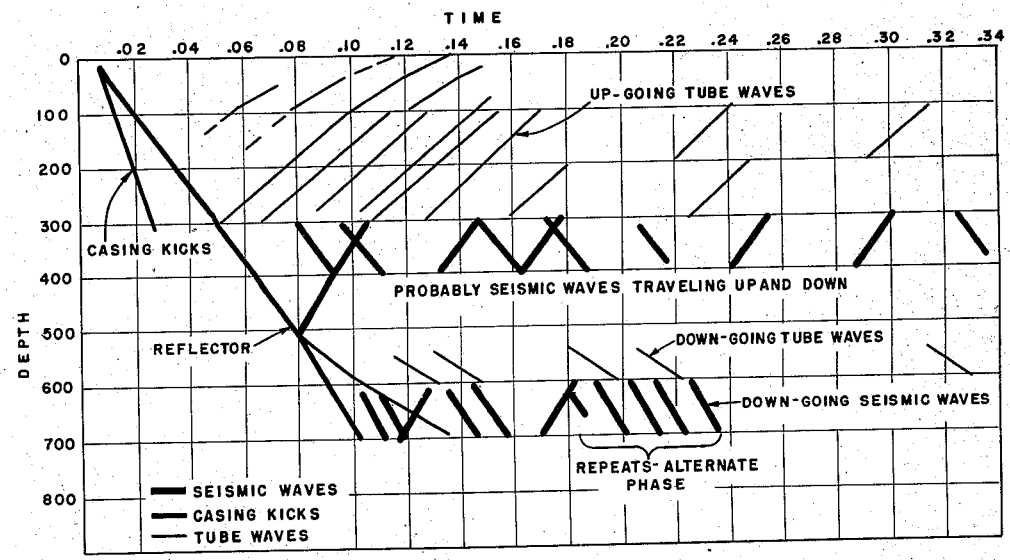
Figs. 4 and 5 are presentations similar to that of Fig. 3 making use of methods known to the prior art.
Figure 4:
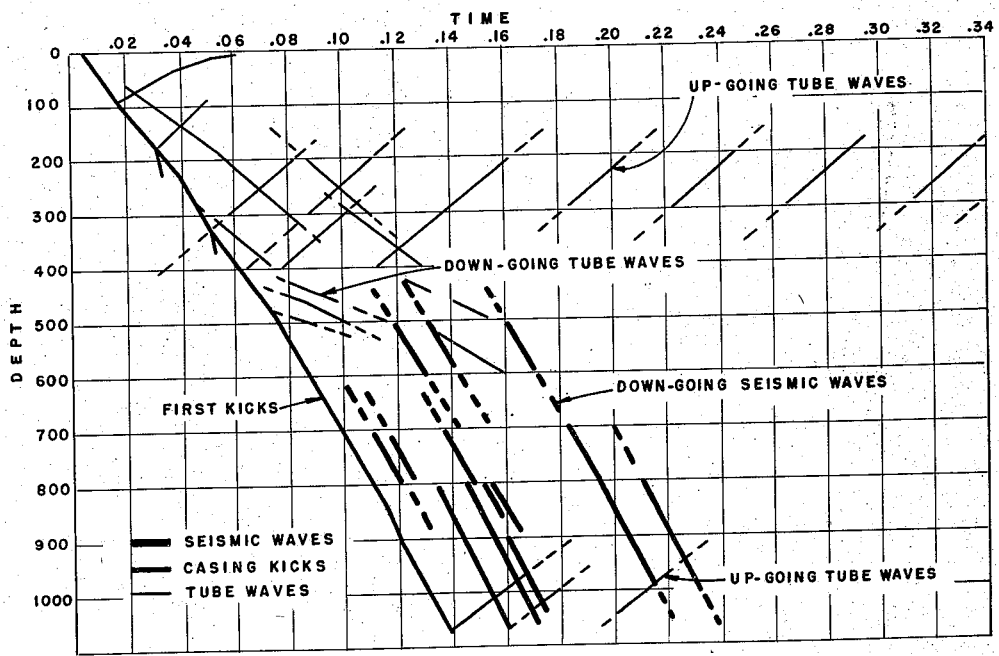

Figs. 4 and 5 are the results of seismic surveys of boreholes in the immediate vicinity of the borehole from which the section of Fig. 3 was obtained, which surveys used wiggly trace presentations. Note the relative paucity of information shown in Figs. 4 and 5 as compared to the information obtainable from Fig. 3. The results of Figs. 4 and 5 were obtained utilizing the techniques known to the prior art, by a thoroughly competent geologist and geophysicist with extensive experience in the interpretation of seismograms. It will be noted that it was impossible to chart the waves completely. It was also quite difficult to determine which of the waves were tube-waves and which could be considered as either primary or multiple-reflection seismic waves. It is to be further noted that the results shown in Figs. 4 and 5 are considered to be excellent, taking into account the fact that prior art techniques were utilized. While the information shown is quite scanty in comparison with the information obtainable utilizing the present invention, the information shown in Figs. 4 and 5 is quite detailed in comparison to the results generally obtainable from wiggly-trace seismogram presentations.

Although the embodiment disclosed in the preceding specification is preferred, other modifications will be apparent to those skilled in the art which do not depart from the broadest aspects of the scope of the invention.

What is claimed is:

1. In a system for seismic prospecting, the method including the steps of: lowering a string of geophones into a borehole, the spacing between successive geophones not exceeding one-quarter wave length at the lowest seismic frequency of interest; detonating an artificial source of elastic waves at the earth's surface in the vicinity of the borehole; recording the waves received by said geophones as a result of said detonation in the form of a variable density presentation wherein the density of the recording varies in accordance with the strength of the received signal, the recordings for said geophones being parallel to each other in the order of the geophones corresponding thereto, and spaced apart by a distance not greater than the width of the individual recordings; and adjusting the slope of the successive recordings of the first received impulses received from said source by successive geophones going down the borehole so that said slope is between 70° and 50° with respect to the individual recordings of the geophones.

2. In a system for seismic prospecting, the method including the following steps: arranging a multiplicity of geophones into a string so that the distance between successive geophones is approximately ten feet; lowering said string of geophones into a borehole by successive steps so that the uppermost geophone at a given step is approximately ten feet below the same depth of the lowermost geophone at the preceding step; detonating an artificial source of seismic waves at the earth's surface in the vicinity of the borehole after every lowering of said string of geophones to a lower level; recording the waves received by said geophones as a result of each detonation to produce a seismic trace at calculable levels down the borehole; re-recording the seismic traces on the same time axis in the form of a variable density presentation wherein the density of a given recorded trace varies in accordance with the strength of the received signal, the recording of each recorded trace being parallel to each other, and spaced apart by a distance not greater than the width of the individual recordings; and adjusting the slope of successive re-recordings of the first impulses received by successive geophones going down the borehole from the earth's surface so that said slope is between 70° and 50° with respect to the individual recordings of the traces.

3. In a system for seismic prospecting, the method including the following steps: lowering a string of geophones into a borehole, the spacing between successive geophones being approximately the same; detonating an artificial source of elastic waves at the earth's surface in the vicinity of the borehole; recording the waves received by said geophones, as a result of said detonation, in the form of a variable density presentation wherein the density of the recording varies in accordance with the strength of the received signal, the recording for each geophone being parallel to each other and spaced apart by a distance not greater than the width of the individual recordings; and adjusting the slope of the successive recordings of the first received impulses received from said source by successive geophones going down the borehole so that said slope is between 70° and 50° with respect to the individual recordings of the geophones.

4. In a system for seismic prospecting, the method including the following steps: arranging a multiplicity of geophones into a string so that the distance between successive geophones is approximately the same; lowering said string of geophones into a borehole by a series of successive steps so that the uppermost geophone at a given step after the first step is approximately the same distance below the depth of the lowermost geophone at the preceding step as the said distance between geophones in said string; detonating an artificial source of seismic waves at the earth's surface in the vicinity of the borehole after every lowering of said string of geophones to a lower level; recording the waves received by said geophones as a result of each detonation to produce a seismic trace at calculable levels down the borehole; re-recording the seismic traces on the same time axis in the form of a variable density presentation wherein the density of a given recorded trace varies in accordance with the strength of the received signal, the recording of each recorded trace being parallel to each other and spaced apart by a distance not greater than the width of the individual recordings; and adjusting the slope of successive re-recordings of the first impulses received by successive geophones going down the borehole from the earth's surface so that said slope is between 70° and 50° with respect to the individual recordings of the traces.

5. The method set forth in claim 2 wherein the slope of said re-recordings of said first impulses is approximately 60°.

6. Apparatus for seismically surveying a borehole including: a plurality of geophones for detecting seismic waves from an artificial seismic wave source, said geophones being disposed at known intervals down said borehole; and means for recording electrical signals produced by said geophones as a variable density presentation, wherein the record for each geophone comprises a line, the length of said line being a function of time from actuation of said seismic source and the density of said line being a function of the intensity of the electrical signal produced by each of said geophones; said lines being parallel and spaced apart a distance not substantially greater than the width of said lines, the record of the first impulses succesisvely received by said geophones from said seismic source making an angle of between 70° to 50° with said lines.

7. Apparatus as set forth in claim 6 wherein the angle between said geophones and said seismic source is approximately 60°.

No references cited.